No. 854,322. PATENTED MAY 21, 1907.
D. K. WILSON.
COMBINED HOG STOP AND CATTLE PASS.
APPLICATION FILED AUG. 30, 1906.

2 SHEETS—SHEET 1.

WITNESSES:
C. M. Jensen
A. Rosgen.

INVENTOR
Dalton K. Wilson,
BY
G. C. Kennedy
ATTORNEY

No. 854,322. PATENTED MAY 21, 1907.
D. K. WILSON.
COMBINED HOG STOP AND CATTLE PASS.
APPLICATION FILED AUG. 30, 1906.

2 SHEETS—SHEET 2.

WITNESSES:
C. M. Jensen
A. Rosgen

INVENTOR
Dalton K. Wilson,
BY
G. C. Kennedy,
ATTORNEY

UNITED STATES PATENT OFFICE.

DALTON K. WILSON, OF GLADBROOK, IOWA.

COMBINED HOG-STOP AND CATTLE-PASS.

No. 854,322.   Specification of Letters Patent.   Patented May 21, 1907.

Application filed August 30, 1906. Serial No. 332,717.

*To all whom it may concern:*

Be it known that I, DALTON K. WILSON, a citizen of the United States of America, and a resident of Gladbrook, Tama county, Iowa, have invented certain new and useful Improvements in a Combined Hog-Stop and Cattle-Pass, of which the following is a specification.

My invention relates to improvements in a combined hog-stop and cattle-pass, and the object of my improvement is to provide a gate-way for cattle and horses to be inserted in a fence of inclosure whereby such animals may pass therethrough without difficulty from one field or building to another, at the same time preventing the passage of hogs therethrough in either direction. This object I have accomplished by the means which are hereinafter described and claimed and which are illustrated in the accompanying drawings, in which—

Figure 1:
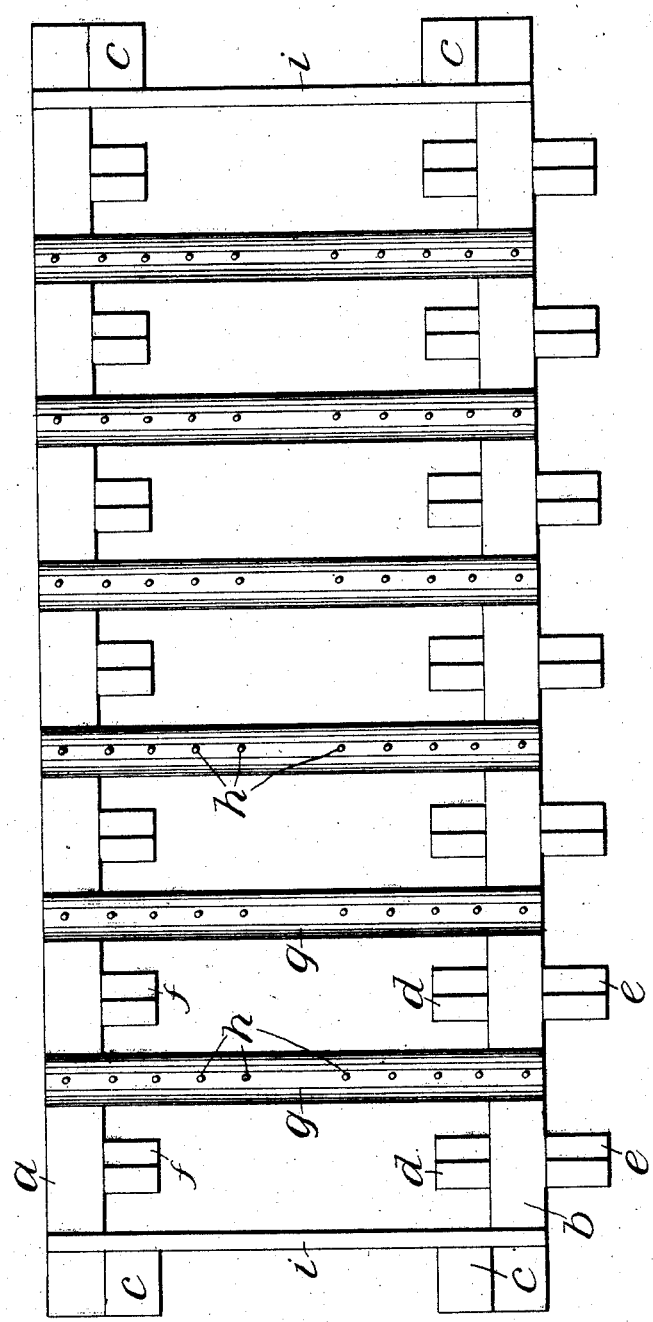
Figure 2:
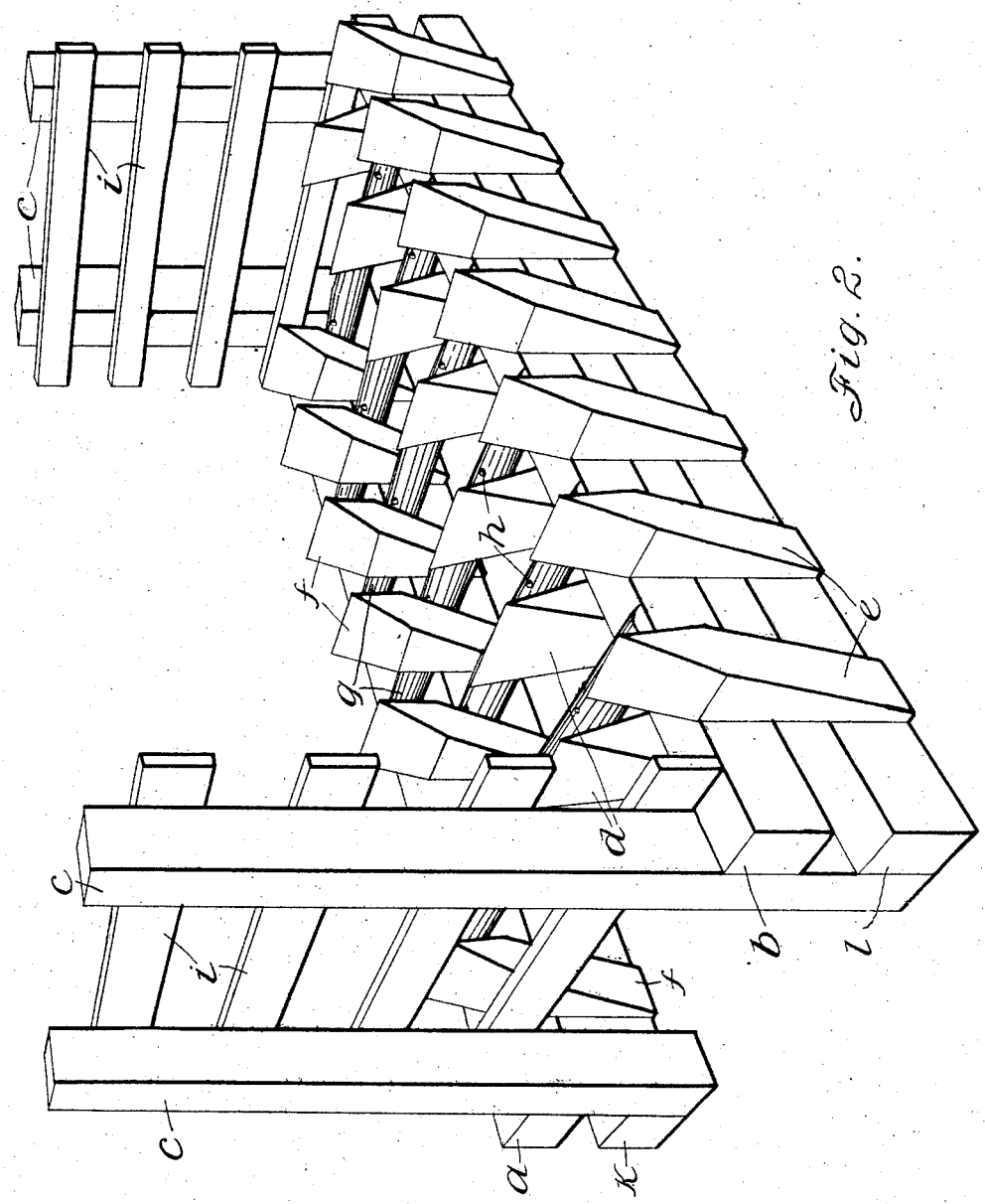

Figure 1 is a plan view of my invention, while Fig. 2 is a perspective elevation thereof.

Similar reference numerals refer to similar parts throughout the several views.

The ends of my device have vertical posts $c$ sustaining horizontal cross-bars $i$, and either of these posts at each end may be connected to the adjoining part of the fence or other inclosure adjacent thereto.

$a$ and $k$ are horizontal sills arranged longitudinally along one side of the device and are attached to the outer sides of the lower parts of the posts $c$, spaced apart and parallel to each other. $b$ and $l$ are similar sills arranged along the other side of the device.

Extending transversely across the device with their ends attached to the upper surfaces of the longitudinal timbers $a$ and $b$ are cross-bars $g$, which are provided on their tops with a plurality of short rounded studs for a purpose presently to be described.

Fastened to the inner side of the longitudinal timbers $a$ and $k$ are vertical blocks $f$ whose tops are wedge-shaped and project a sufficient distance above the top of the timber $a$. The width of these blocks is greater at the top than at the bottom. A similar row of blocks $d$ are fastened to the inner side of the longitudinal timbers $b$ and $l$ opposite to the former row of blocks. Another similar row of blocks $e$ are fastened to the outside of the timbers $b$ and $l$ opposite to the other rows. The upper projecting angles of the blocks $e$ are turned outward, while the same projecting angles of the blocks $d$ and $f$ are turned inward toward each other.

This device is impracticable for the passage of a hog, for the reason that the animal will crowd himself between the blocks $e$ or $f$ and then straddle the cross-bar $g$ between them, alighting upon the short rounded studs $h$. These studs interfere with his forward movement both by reason of their engagement and the feeling of uneasiness induced in him when he attempts to crowd forward over them. The spaces between the blocks are too small to permit the animal to move to either side, and his only alternative is to retire from the device. It is obvious that a larger animal, such as a horse or cow, can easily step over the said impediments and between the cross-bars $g$, and pass the device without hindrance. This device is especially useful, when used for the purposes heretofore mentioned, or on the other hand when placed between adjoining fields in which different breeds of hogs are quartered, to keep them apart.

Having described my invention, what I claim as new, and desire to secure by Letters Patent of the United States, is—

1. A device of the character described, comprising in combination with an impounding inclosure, a longitudinal structure inserted therein, blocks attached to said structure and projecting thereabove, and cross-bars fastened upon said structure between said blocks.

2. A device of the character described comprising in combination with an impounding inclosure, longitudinal structures spaced apart, and inserted therein, blocks attached to said structure and projecting thereabove, and cross-bars fastened transversely upon said structures between said blocks.

3. A device of the character described, comprising in combination with an impounding inclosure, a longitudinal structure inserted therein, cross-bars fastened transversely upon said structure and spaced apart, and a plurality of projecting studs upon said cross-bars.

4. A device of the character described, comprising in combination with an impounding inclosure, longitudinal structures inserted therein and spaced apart, cross-bars fastened transversely upon said structures and spaced apart, and a plurality of projecting studs upon said cross-bars.

5. A device of the character described, comprising in combination with an impounding inclosure, a longitudinal structure inserted therein, blocks attached to said structure and projecting thereabove, cross-bars fastened upon said structure between said blocks, and a plurality of studs upon said cross-bars.

6. A device of the character described, comprising in combination with an impounding inclosure, longitudinal structures inserted therein and spaced apart, blocks attached to said structure and projecting thereabove, cross-bars fastened transversely upon said structures between said blocks, and a plurality of projecting studs upon said cross-bars.

Signed at Gladbrook, Iowa, this 11th day of Aug. 1906.

DALTON K. WILSON.

Witnesses:
HENRY W. DODD,
JESSE G. BRINKERHOFF.